(12) United States Patent
Yuasa

(10) Patent No.: US 10,620,562 B2
(45) Date of Patent: Apr. 14, 2020

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Yuzuru Yuasa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/301,199

(22) PCT Filed: May 12, 2017

(86) PCT No.: PCT/JP2017/018112
§ 371 (c)(1),
(2) Date: Nov. 13, 2018

(87) PCT Pub. No.: WO2018/003317
PCT Pub. Date: Jan. 4, 2018

(65) Prior Publication Data
US 2019/0146371 A1    May 16, 2019

(30) Foreign Application Priority Data
Jun. 27, 2016    (JP) .................................. 2016-126868

(51) Int. Cl.
*G03G 15/04*    (2006.01)
*H04N 1/113*    (2006.01)
*G02B 26/12*    (2006.01)

(52) U.S. Cl.
CPC ..... *G03G 15/04036* (2013.01); *G02B 26/125* (2013.01); *G03G 15/04* (2013.01); *H04N 1/113* (2013.01); *H04N 2201/0094* (2013.01)

(58) Field of Classification Search
CPC ............ G03G 15/04036; G03G 15/04; G03G 21/1666; B41J 2/471; G02B 26/125; H04N 1/113; H04N 2201/0094
See application file for complete search history.

(56) References Cited

U.S. PATENT DOCUMENTS

| 2007/0058235 A1 | 3/2007 | Nagase | |
| 2010/0033775 A1* | 2/2010 | Miyanagi | G02B 5/08 |
| | | | 358/505 |
| 2010/0124435 A1 | 5/2010 | Uduki | |

FOREIGN PATENT DOCUMENTS

| JP | 2002-258201 | 9/2002 |
| JP | 2005-092119 | 4/2005 |
| JP | 2011-118325 | 6/2011 |

OTHER PUBLICATIONS

International Search Report dated Jul. 25, 2017 in International (PCT) Application No. PCT/JP2017/018112.

* cited by examiner

*Primary Examiner* — Joseph S Wong
(74) *Attorney, Agent, or Firm* — Wenderoth, Lind & Ponack, L.L.P.

(57) ABSTRACT

In a housing, an installation surface (44g) of an image forming lens unit (42L) is formed at a higher position by a level difference than an installation surface (44f) of a polygon motor (41), and when viewed from a rotation axis direction of a polygon mirror unit (40), a diameter (r) of a circumscribed circle passing each apex of the polygon mirror unit (40) is larger than an outer diameter (R) of a rotor part (41a) of the polygon motor (41).

7 Claims, 8 Drawing Sheets

//OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

In the related art, as an optical scanning device installed in an electrophotographic image forming apparatus, there has been known an optical scanning device including a light source, a polygon mirror unit that allows light beams emitted from the light source to be scanned in a main scanning direction, an image forming lens that forms an image of the light beams scanned by the polygon mirror unit on a surface to be scanned, and a housing that receives these optical devices therein (see Patent literature 1). The housing has a bottomed box shape opened upward and an upper side of the housing is closed by a lid member.

CITATION LIST

Patent Literature

Patent Literature 1: Japanese Unexamined Patent Application Publication No. 2002-258201

SUMMARY OF INVENTION

Technical Problem

In the light scanner disclosed in the Patent document 1, airflow generated by the rotation of the polygon mirror unit reaches a sidewall part of the housing, so that the vicinity of the sidewall part enters a negative pressure state and thus air out of the housing is introduced into the housing from a space between the housing and the lid member together with foreign matters (dust, dirt and the like). When the foreign matters introduced into the housing together with the airflow are attached to a reflecting surface of the polygon mirror unit, optical performance of the light scanner is reduced.

In this regard, it is considered to prevent the vicinity of the sidewall part of the housing from entering a negative pressure state by surrounding the periphery of the polygon mirror unit by a partition wall and allowing the airflow generated by the rotation of the polygon mirror unit to be circulated in the vicinity of the polygon mirror unit. However, in such a case, since the partition wall need to be provided, the number of parts increases, resulting in an increase in cost.

The present invention has been made to solve the aforementioned problems, and an object of the present invention is to provide an optical scanning device and an image forming apparatus, by which it is possible to ensure a dustproof property of a housing by an inexpensive configuration.

Solution to Problem

An optical scanning device according to the present invention includes a housing in which an upper side is closed by a lid member, a polygon mirror unit received in the housing and deflecting and scanning each light beam emitted from a light source, a polygon motor having a rotor part provided at a lower side of the polygon mirror unit to rotationally drive the polygon mirror unit, and image forming lens units that form an image of the light beam deflected and scanned in the polygon mirror unit on a surface to be scanned.

In the housing, an installation surface, on which the image forming lens unit is installed, is formed at a higher position by a level difference than an installation surface on which the polygon motor is installed, and when viewed from a rotation axis direction of the polygon mirror unit, a diameter of a circumscribed circle passing each apex of the polygon mirror unit is larger than an outer diameter of the rotor part of the polygon motor.

An image forming apparatus according to the present invention includes the aforementioned optical scanning device.

Advantageous Effects of Invention

According to the present invention, it is possible to provide an optical scanning device and an image forming apparatus, by which it is possible to ensure a dustproof property of a housing by an inexpensive configuration.

DESCRIPTION OF EMBODIMENTS

Hereinafter, embodiments of the present invention will be described in detail on the basis of the drawings. It is noted that the present invention is not limited to the following embodiments.

Embodiment

Figure 1:
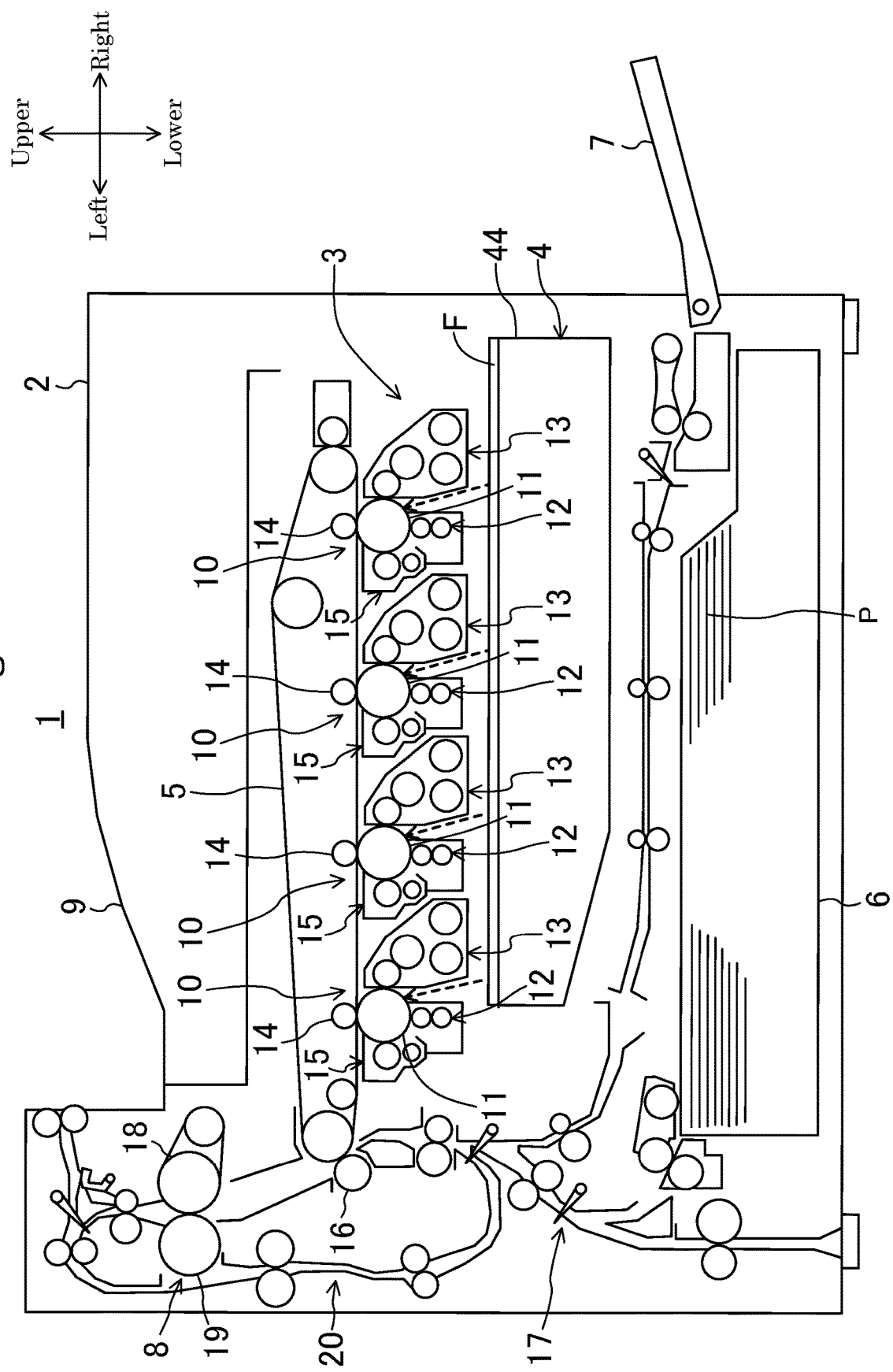
FIG. 1 is a schematic view illustrating an image forming apparatus provided with an optical scanning device in an embodiment.

FIG. 1 illustrates a schematic configuration view of an image forming apparatus 1 in an embodiment. The image forming apparatus 1 is a tandem type color printer and includes an image forming unit 3 in a box-like casing 2. The image forming unit 3 is a part that transfers an image to a recording sheet P and forms the image on the recording sheet P on the basis of image data transmitted from an external device such as a computer subjected to network connection and the like. Below the image forming unit 3, an optical scanning device 4 is disposed to irradiate light beams (laser beams), and above the image forming unit 3, a transfer belt 5 is disposed. Below the optical scanning device 4, a sheet storage unit 6 is disposed to store the recording sheet P, and at the lateral side of the sheet storage unit 6, a manual sheet feeding unit 7 is disposed. At a lateral upper side of the transfer belt 5, a fixing unit 8 is disposed to perform a fixing process on the image transferred to and formed on the recording sheet P. A reference numeral 9 indicates a sheet discharge unit disposed at an upper part of the casing 2 to discharge the recording sheet P subjected to the fixing process in the fixing unit 8.

The image forming unit 3 includes four image forming units 10 disposed in a row along the transfer belt 5. Each of the image forming units 10 has a photosensitive drum 11. Directly under each photosensitive drum 11, a charging device 12 is disposed, and at one side of each photosensitive drum 11, a developing device 13 is disposed. Directly above each photosensitive drum 11, a primary transfer roller 14 is disposed, and at the other side of each photosensitive drum 11, a cleaning unit 15 is disposed to clean the peripheral surface of the photosensitive drum 11.

The peripheral surface of each photosensitive drum 11 is uniformly charged by the charging device 12, and laser beams corresponding to each color based on the image data inputted from the aforementioned computer and the like are irradiated to the charged peripheral surface of the photosensitive drum 11 from the optical scanning device 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller disposed below the fixing unit 8 in the state of abutting the transfer belt 5, wherein the recording sheet P conveyed along a sheet conveyance path 17 from the sheet storage unit 6 or the manual sheet feeding unit 7 is interposed between the secondary transfer roller 16 and the transfer belt 5, and the toner images on the transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be heated and pressurized, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

Figure 2:
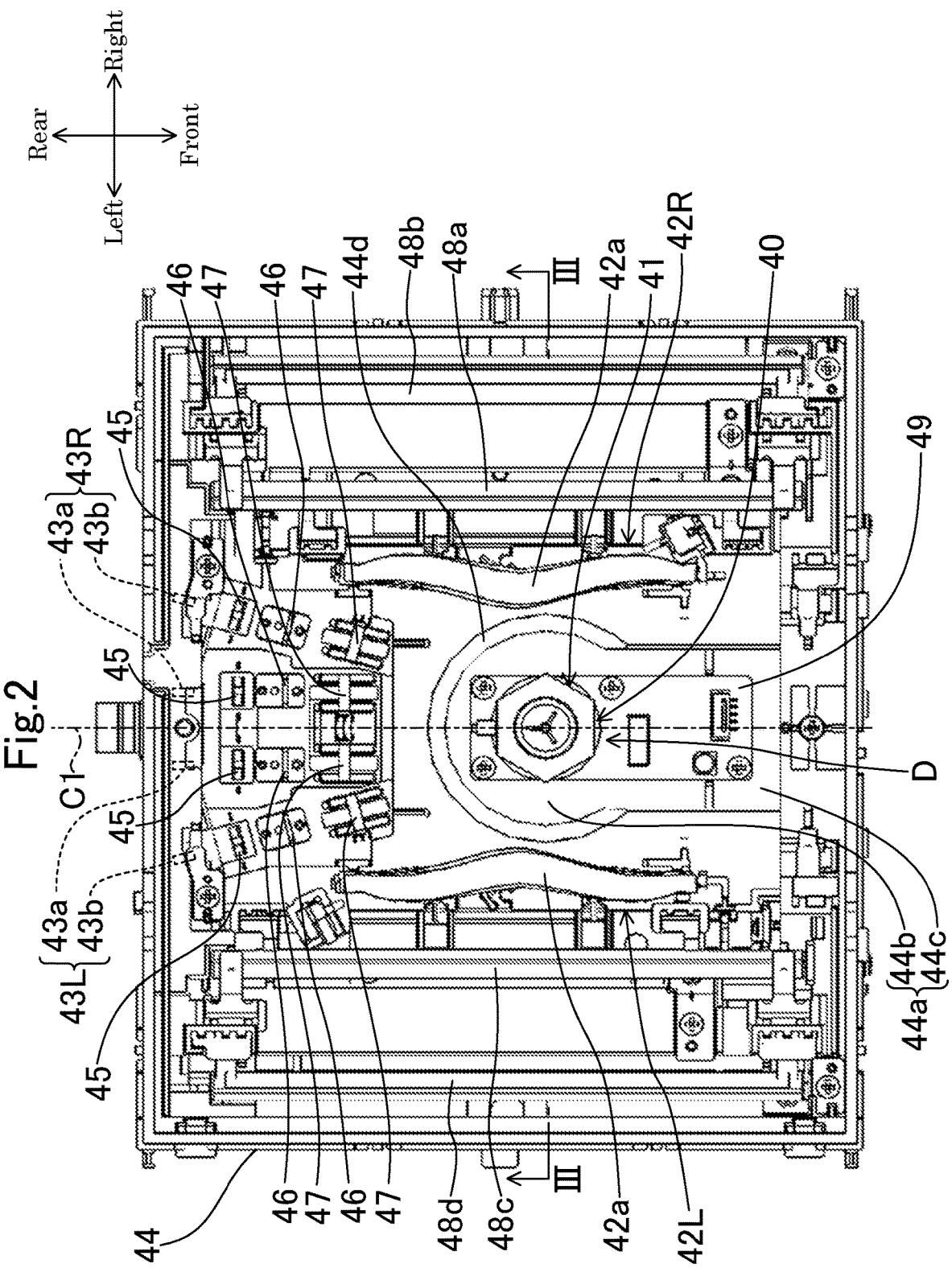
FIG. 2 is a schematic plan view illustrating an optical scanning device.
Figure 3:
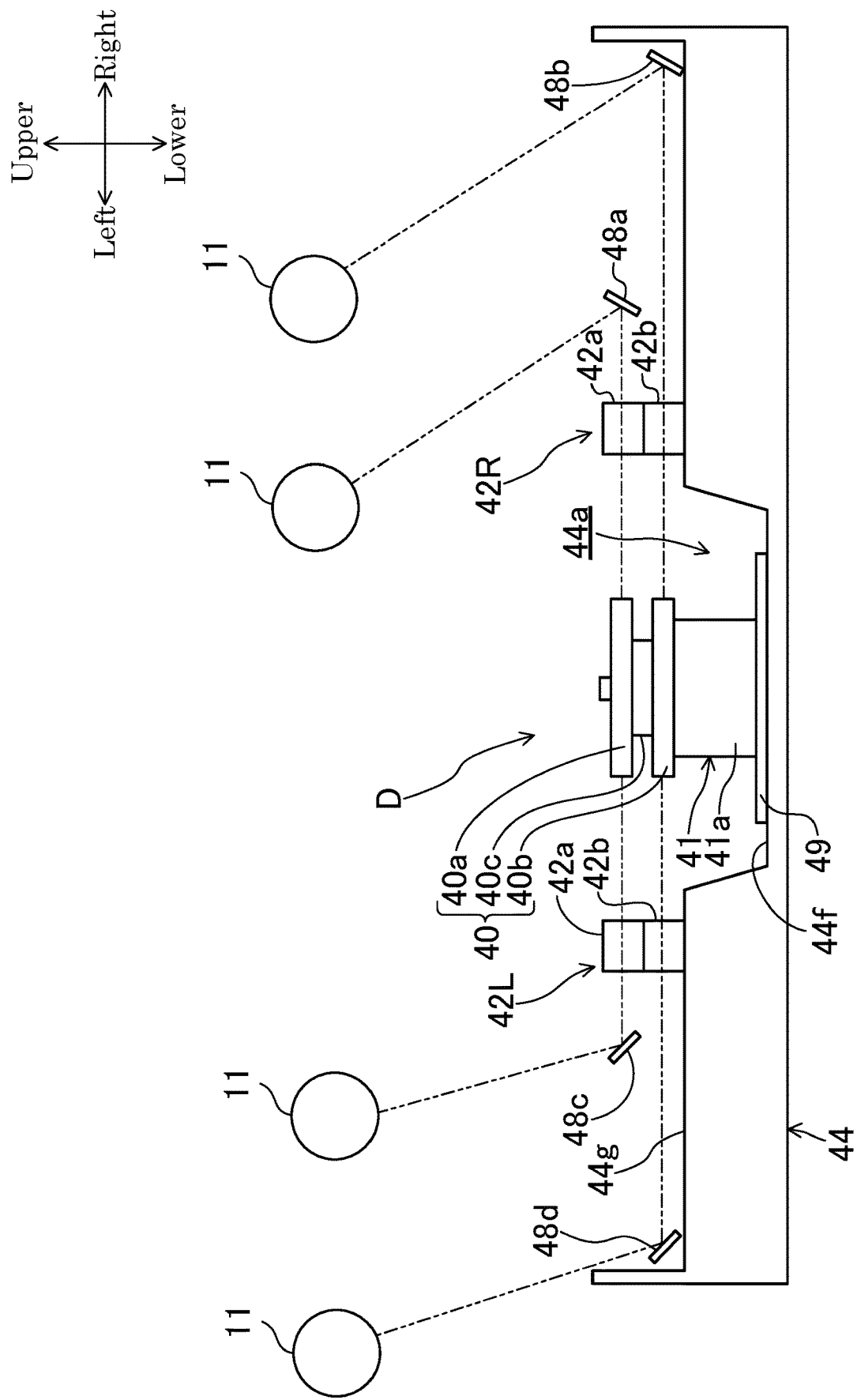
FIG. 3 is a schematic view illustrating a section taken along line III-III of FIG. 2.

Next, details of the optical scanning device 4 will be described with reference to FIG. 2 and FIG. 3. FIG. 2 is a plan view illustrating an internal structure of the optical scanning device 4 and FIG. 3 is a view viewed in the arrow direction of III-III of FIG. 2.

The optical scanning device 4 has a left light source unit 43L and a right light source unit 43R, a deflector D that deflects and scans light beams emitted from the light source units 43L and 43R, a left image forming lens unit 42L and a right image forming lens unit 42R that form images of the light beams deflected and scanned by the deflector D on the surfaces of the photosensitive drums 11, and a housing 44 that receives these elements therein. The housing 44 is a rectangular box-like resin case opened upward and an upper side of the housing 44 is closed by a lid member F (illustrated only in FIG. 1).

The deflector D has a polygon mirror unit 40 and a polygon motor 41 provided at a lower side of the polygon mirror unit 40 to rotationally drive the polygon mirror unit 40.

The polygon mirror unit 40 has an upper polygon mirror 40a and a lower polygon mirror 40b disposed spaced apart from each other in an up and down direction, and a connection part 40c that connects both polygon mirrors 40a and 40b to each other. Both polygon mirrors 40a and 40b have a regular hexagonal shape in a plan view and are coaxially disposed with each other.

The polygon motor 41 is an electric motor fixed onto a rectangular control board 49. The polygon motor 41 has a cylindrical rotor part 41a having a shaft center extending in the up and down direction. The polygon mirror unit 40 is fixed to an upper end part of the rotor part 41a and rotates together with the rotor part 41a.

When an outer diameter of the rotor part 41a of the polygon motor 41 is set as R and a diameter of a circumscribed circle passing each apex of the polygon mirror unit 40 when the polygon mirror unit 40 is viewed from a rotation axis direction is set as r, a relation of R<r is satisfied. When the rotor part 41a does not have a cylindrical shape (for example, has a polygonal prismatic shape), the outer diameter R of the rotor part 41a represents an average value of diameters of the rotor part 41a at each position in a circumferential direction.

Furthermore, when a distance from a lower end surface to an upper end surface of the rotor part 41a of the polygon motor 41 is set as H (see FIG. 4) and a distance from a lower end surface to an upper end surface of the polygon mirror unit 40 is set as h, a relation of H>h is satisfied.

Referring to FIG. 2, the left light source unit 43L and the right light source unit 43R are bilaterally symmetrically disposed while interposing a straight line C1, which passes through the shaft center of the polygon motor 41 and extends in a front and rear direction, therebetween. Each of the light source units 43L and 43R has an upper laser light source 43a that emits light beams toward the upper polygon mirror 40a and a lower laser light source 43b that emits light beams toward the lower polygon mirror 40b.

Between the light sources 43a and 43b of the left light source unit 43L/the light sources 43a and 43b of the right light source unit 43R and the polygon mirrors 40a and 40b, a collimator lens 45, an aperture 46, and a cylindrical lens 47 are disposed in this order. The collimator lens 45 converts the light beams emitted from the light sources 43a and 43b into parallel light. The aperture 46 limits a range of the luminous flux of the light beams having passed through the collimator lens 45. The cylindrical lens 47 allows the light beams having passed through the aperture 46 to be collected on the polygon mirrors 40a and 40b.

The left image forming lens unit 42L and the right image forming lens unit 42R are bilaterally symmetrically disposed while interposing the straight line C1 therebetween. Each image forming lens unit 42 has an upper image forming lens 42a through which the light beams reflected by the upper polygon mirror 40a pass and a lower image forming lens 42b through which the light beams reflected by the lower polygon mirror 40b pass. The image forming lenses 42a and 42b are long fθ lenses extending in the front and rear direction, deflect the light beams reflected by the polygon mirrors 40a and 40b at a constant velocity, and allow images of the light beams to be formed on the surfaces of the photosensitive drums 11.

When the optical scanning device 4 operates, the light beams emitted from the light sources 43a and 43b of each of the left light source unit 43L and the right light source unit 43R are irradiated to the polygon mirror unit 40 by passing through the collimator lens 45, the aperture 46, and the cylindrical lens 47 (see two dot chain lines of FIG. 3). The irradiated light beams are deflected and scanned in the polygon mirror unit 40 in a main scanning direction (a direction vertical to the paper surface of FIG. 3), pass through the left and right image forming lens units 42L and 42R, and then are reflected by return mirrors 48a to 48d, so that images of the light beams are formed on the surfaces of the photosensitive drums 11 corresponding to each color. The surface of each photosensitive drum 11 constitutes a surface on which each light beam is scanned.

Figure 4:
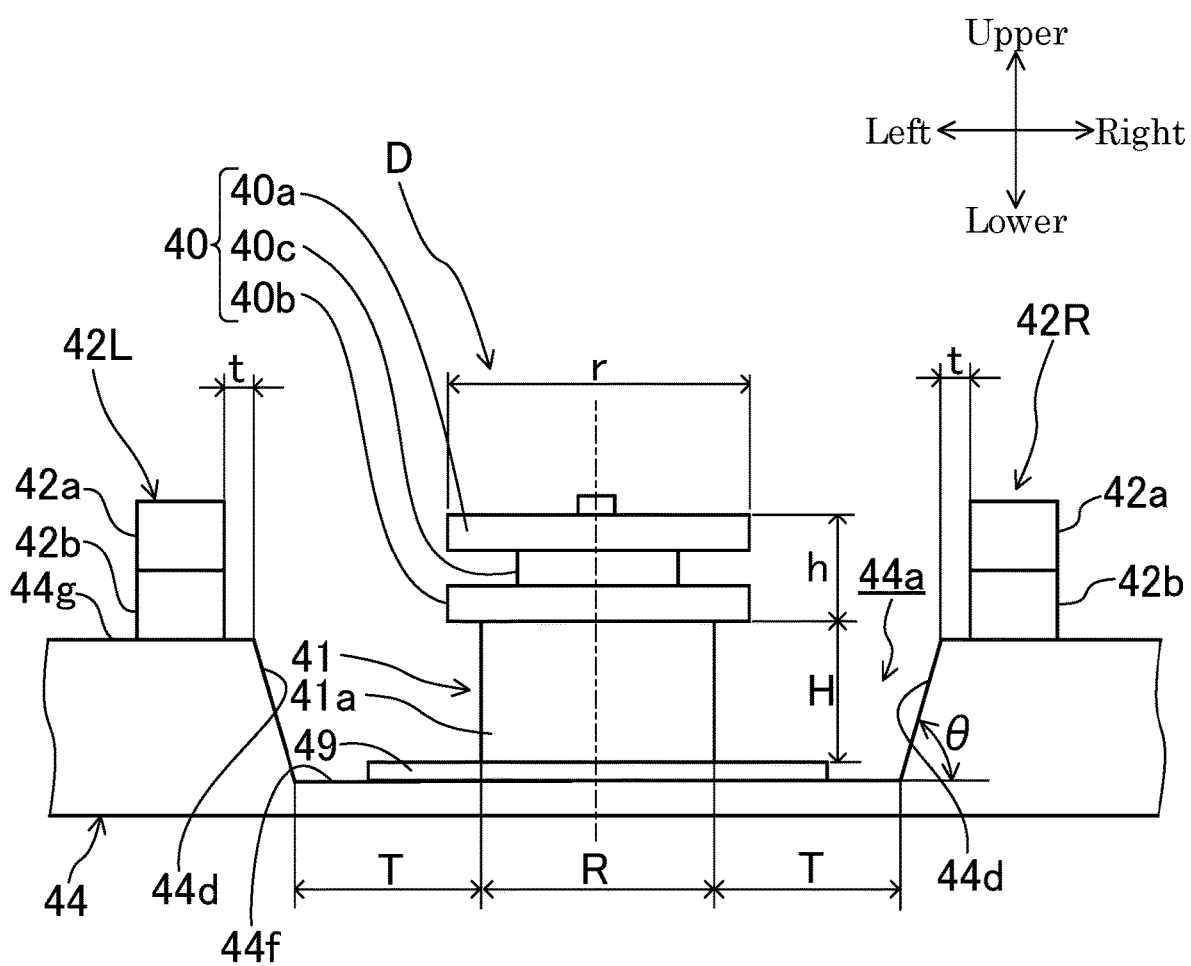
FIG. 4 is an enlarged schematic view illustrating the periphery of a polygon mirror unit.

As illustrated in FIG. 4, the polygon motor 41 is fixed to a bottom wall part of the housing 44 via the control board 49. The housing 44 is formed at the bottom wall part thereof with a bottomed concave part 44a opened upward. The bottomed concave part 44a has a circular concave part 44b (see FIG. 2) coaxial with the polygon motor 41 and a rectangular concave part 44c extending forward from a front end part of the circular concave part 44b. A bottom surface of the bottomed concave part 44a serves as a motor installation surface 44f on which the polygon motor 41 is installed.

The left image forming lens unit 42L and the right image forming lens unit 42R are disposed at a higher position by a level difference than the motor installation surface 44f. The housing 44 has a connection surface 44d that connects an edge of an installation surface 44g (hereinafter, referred to as a lens installation surface 44g) of the image forming lens unit 42L (or the image forming lens unit 42R), which faces the polygon motor 41 side, to an edge of the motor installation surface 44f, which faces the image forming lens unit 42L (or the image forming lens unit 42R) side.

The connection surface 44d serves as an inclined surface in which a height is increased toward the image forming lens unit 42L (or the image forming lens unit 42R) side from the motor 41 side. Preferably, an inclination angle θ of the inclined surface is equal to or more than 45° and smaller than 90° (in other words, an angle between the motor installation surface 44f and the connection surface 44d is larger than 90° and is equal to or less than 135°, and in the present embodiment, the inclination angle θ is 65° for example.

When a distance from the edge of the lens installation surface 44g, which faces the polygon mirror unit 40 side, to the image forming lens unit 42L, 42R is set as t and a distance from the edge of the motor installation surface 44f, which faces the image forming lens unit 42L side (or the image forming lens unit 42R side), to an outer peripheral surface of the polygon motor 41 is set as T, a relation of t<T is satisfied.

Next, with reference to FIG. 5, airflow around the deflector D when the optical scanning device 4 operates will be described. When the optical scanning device 4 operates, since the polygon mirror unit 40 rotates at a high speed, air around the polygon mirror unit 40 is accelerated radially outward by centrifugal force. The airflow toward a radial outside is blocked by the image forming lens units 42L and 42R and changes the direction to downward, so that descending air current is generated.

On the other hand, around the polygon mirror unit 40, since the speed of the airflow is increased by an influence of the centrifugal force, a negative pressure area occurs on the basis of Bernoulli's theorem. Therefore, air around the rotor part 41a is accelerated by the centrifugal force of the rotor part 41a, is attracted to the negative pressure area, and thus serves as ascending air current. Then, due to the ascending air current and the descending air current, a circulation air current is formed at the lateral side of the deflector D. Consequently, the airflow accelerated radially outward together with the rotation of the polygon mirror unit 40 can be prevented from reaching near the sidewall part of the housing 44. Accordingly, a negative pressure area is formed near the sidewall part of the housing 44, so that air out of the housing 44 can be prevented from flowing into the housing 44 from a space between the housing 44 and the lid member F. Thus, the reflecting surfaces of the polygon mirrors 40a and 40b and the surfaces of the image forming lens units 42L and 42R can be prevented from being contaminated by foreign matters introduced into the housing 44 together with the airflow.

In addition, since the diameter r of the circumscribed circle of the polygon mirror unit 40 is larger than the outer diameter R of the rotor part 41a, the flow rate of the descending air current is higher than that of the ascending air current. Consequently, the ascending air current can be prevented from reaching the sidewall part of the housing 44 by climbing over the image forming lens units 42L and 42R. Furthermore, the outer diameter R of the rotor part 41a is reduced, so that a circulation space of airflow can be sufficiently ensured at the lateral side of the rotor part 41a. Thus, a part of the airflow can be reliably prevented from reaching the sidewall part of the housing 44 by climbing over the image forming lens units 42L and 42R.

Furthermore, in the present embodiment, the distance H from the lower end surface to the upper end surface of the rotor part 41a is larger than the distance h from the lower end surface to the upper end surface of the polygon mirror unit 40. In this way, a circulation space of airflow can be sufficiently ensured at the installation surface side of the polygon motor 41. Thus, the airflow can be drawn to the space and thus can be efficiently circulated.

Moreover, in the present embodiment, when the distance from the edge of the lens installation surface 44g, which faces the polygon mirror unit 40 side, to the image forming lens unit 42L (or the image forming lens unit 42R) is set as t and the distance from the edge of the motor installation surface 44f, which faces the image forming lens unit 42L (or the image forming lens unit 42R), to the outer peripheral surface of the polygon motor 41 is set as T, the relation of T>t is satisfied.

As described above, when the distance t is shortened as much as possible and the distance T is lengthened as much as possible, the circulation space of airflow is sufficiently ensured, so that it is possible to improve air circulation.

Moreover, in the present embodiment, the connection surface 44d, which connects the edge of the installation surface 44g of the image forming lens unit 42L (or the image forming lens unit 42R) facing the polygon motor 41 side to the edge of the motor installation surface 44f facing the image forming lens unit 42L (or the image forming lens unit 42R) side, serves as the inclined surface in which the height is increased toward the image forming lens unit 42L (or the image forming lens unit 42R) side from the polygon motor 41 side.

According to this, the descending air current generated due to the rotation of the polygon mirror unit 40 smoothly flows along the connection surface 44d, so that it is possible to suppress separation of the descending air current. Accordingly, it is possible to prevent disturbance of the circulation air current formed by the descending air current and the ascending air current.

Furthermore, in the present embodiment, the polygon mirror unit 40 is configured by disposing the upper polygon mirror 40a and the lower polygon mirror 40b in two stages. Consequently, as compared with a case where the number of stages of the polygon mirror is 1, the distance h from the lower end surface to the upper end surface of the polygon mirror unit 40 is increased, resulting in an increase in the amount of the airflow accelerated radially outward together with the rotation of the polygon mirror unit 40. Therefore, since the airflow easily reaches near the sidewall part of the housing 44, the aforementioned problem of foreign matter intrusion into the housing is particularly easy to occur. The configuration of the present invention is particularly useful for such a configuration.

Modification Example 1

Figure 5:
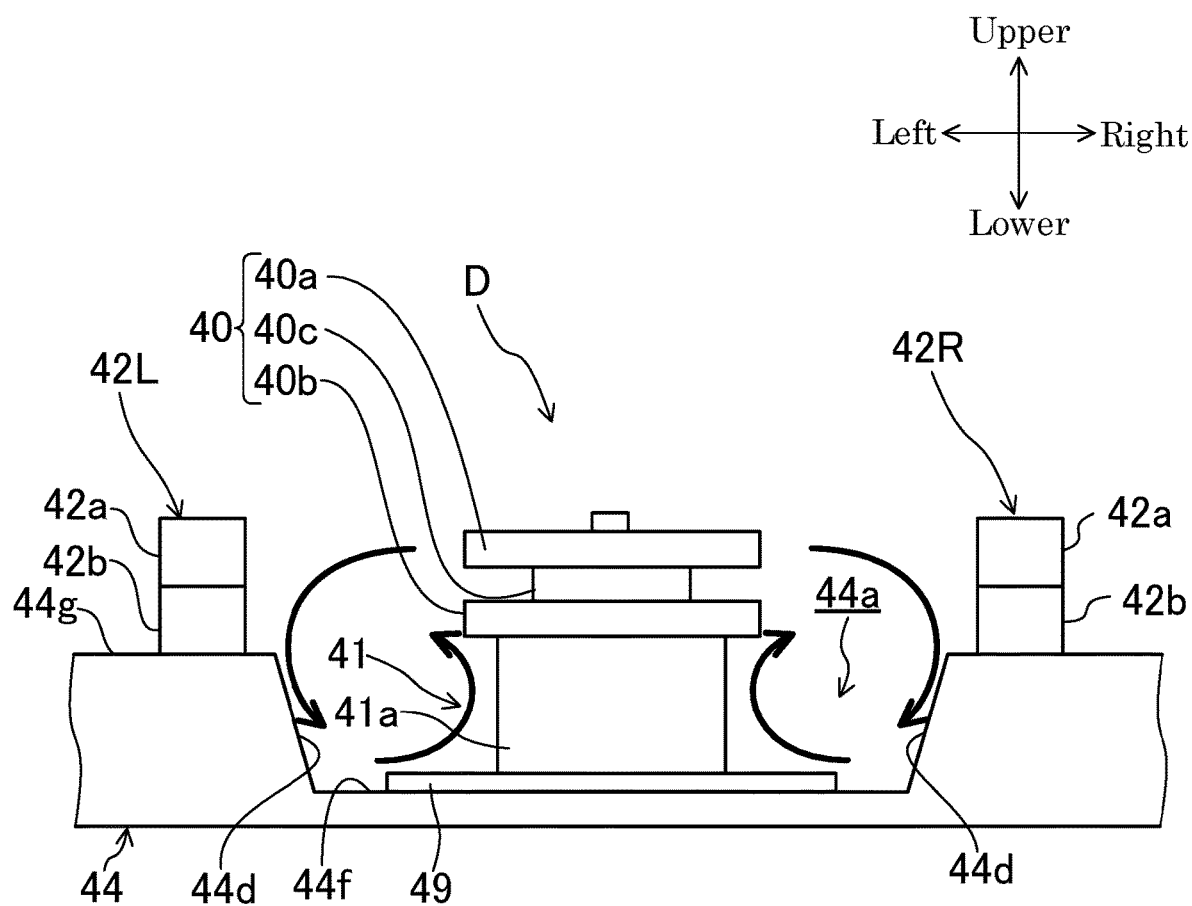
FIG. 5 is an explanation view for explaining airflow around a polygon mirror unit.
Figure 6:
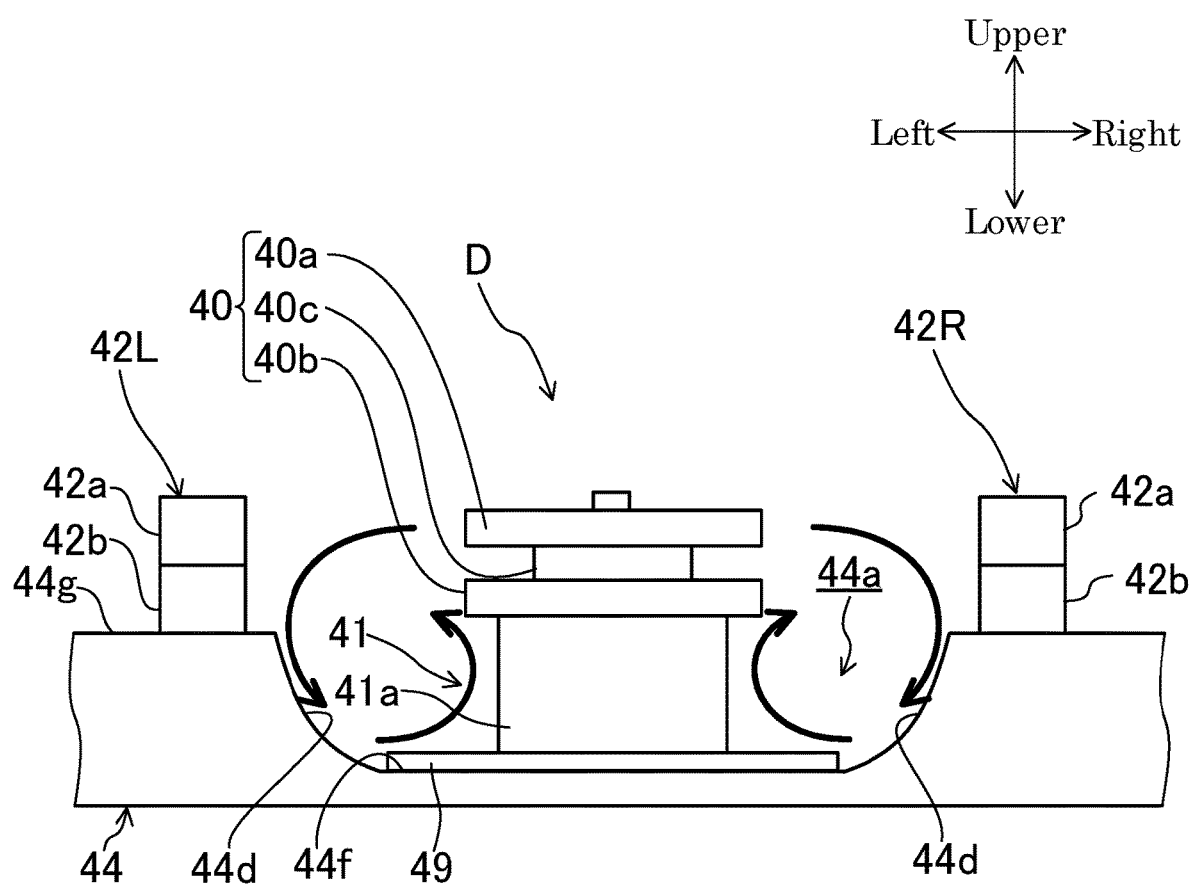
FIG. 6 is a view corresponding to FIG. 5, which illustrates a modification example 1.

FIG. 6 is a view corresponding to FIG. 5, which illustrates a modification example 1. The modification example 1 is different from the embodiment 1 in terms of the shape of the connection surface 44d.

That is, in the modification example 1, the connection surface 44d is a curved surface, wherein the curved surface is formed in an arc shape in which the slope of a tangent becomes steep toward the image forming lens unit 42L (or the image forming lens unit 42R) from the rotor part 41a side when viewed from the main scanning direction (that is, a longitudinal direction of the image forming lens units 42L and 42R and a direction vertical to the paper surface of FIG. 6).

According to such a configuration, as compared with the configuration in which the connection surface 44d is configured with the inclined surface, the descending air current generated due to the rotation of the polygon mirror unit 40 can be allowed to smoothly flow along the connection surface 44d. Thus, it is possible to more reliably suppress the separation of the descending air current as compared with the embodiment 1. Accordingly, it is possible to prevent improve circulation of airflow formed by the descending air current and the ascending air current.

Modification Example 2

Figure 7:
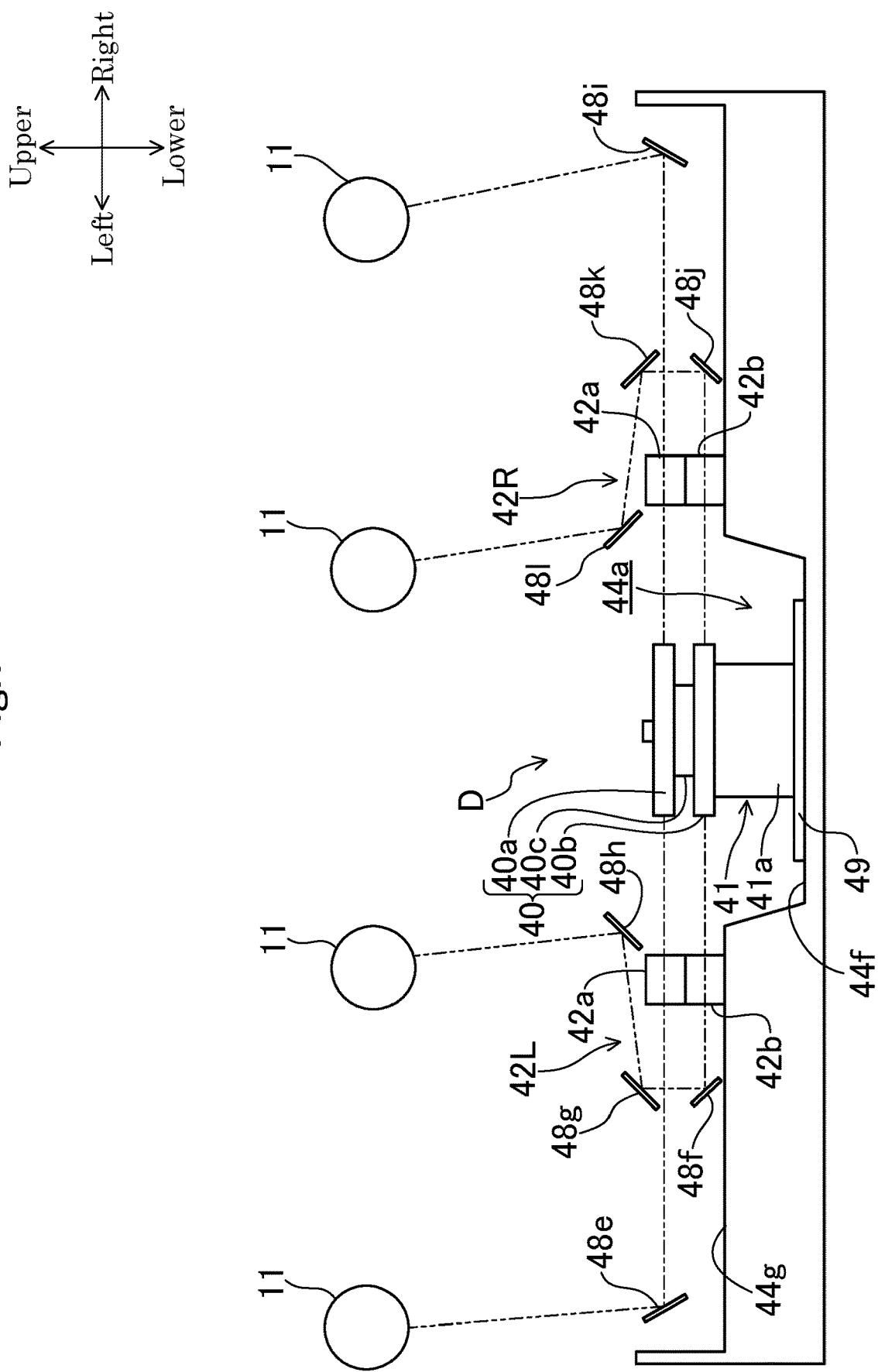
FIG. 7 is a view corresponding to FIG. 3, which illustrates a modification example 2.

FIG. 7 is a view corresponding to FIG. 3, which illustrates a modification example 2. The modification example 2 is different from the aforementioned embodiment and modification example 1 in terms of the arrangement of return mirrors 48e to 48l for leading light beams having passed through the image forming lens units 42L and 42R to each photosensitive drum 11.

That is, in the modification example 2, the optical scanning device 4 has the return mirror 48e for leading the light beams having passed through the upper image forming lens 42a of the left image forming lens unit 42L to the photosensitive drum 11, the three return mirrors 48f to 48h for leading the light beams having passed through the lower image forming lens 42b to the photosensitive drum 11, the return mirror 48i for leading the light beams having passed through the upper image forming lens 42a of the right image forming lens unit 42R to the photosensitive drum 11, and the return mirrors 48j to 48l for leading the light beams having passed through the lower image forming lens 42b to the photosensitive drum 11.

The return mirrors 48h and 48l are disposed between the polygon mirror unit 40 and the image forming lens unit 42L (or the image forming lens unit 42R) when viewed from above. These two return mirrors 48h and 48l are bilaterally symmetrically disposed while interposing the polygon mirror unit 40 (the aforementioned straight line C1) therebetween.

The left return mirror (an inclined mirror) 48h is inclined downward toward the left image forming lens unit 42L side from the polygon mirror unit 40 side when viewed from the main scanning direction. Similarly, the right return mirror (an inclined mirror) 48l is inclined downward toward the right image forming lens unit 42R side from the polygon mirror unit 40 side when viewed from the main scanning direction.

The lower end of the left return mirror 48h is positioned in the vicinity of the edge of the upper end surface of the left image forming lens unit 42L, which faces the polygon mirror unit 40 side. The edge is positioned on an extension line of the return mirror 48h when viewed from the main scanning direction. Similarly, the lower end of the right return mirror 48l is positioned in the vicinity of the edge of the upper end surface of the right image forming lens unit 42R, which faces the polygon mirror unit 40 side. The edge is positioned on an extension line of the return mirror 48l when viewed from the main scanning direction.

Figure 8:
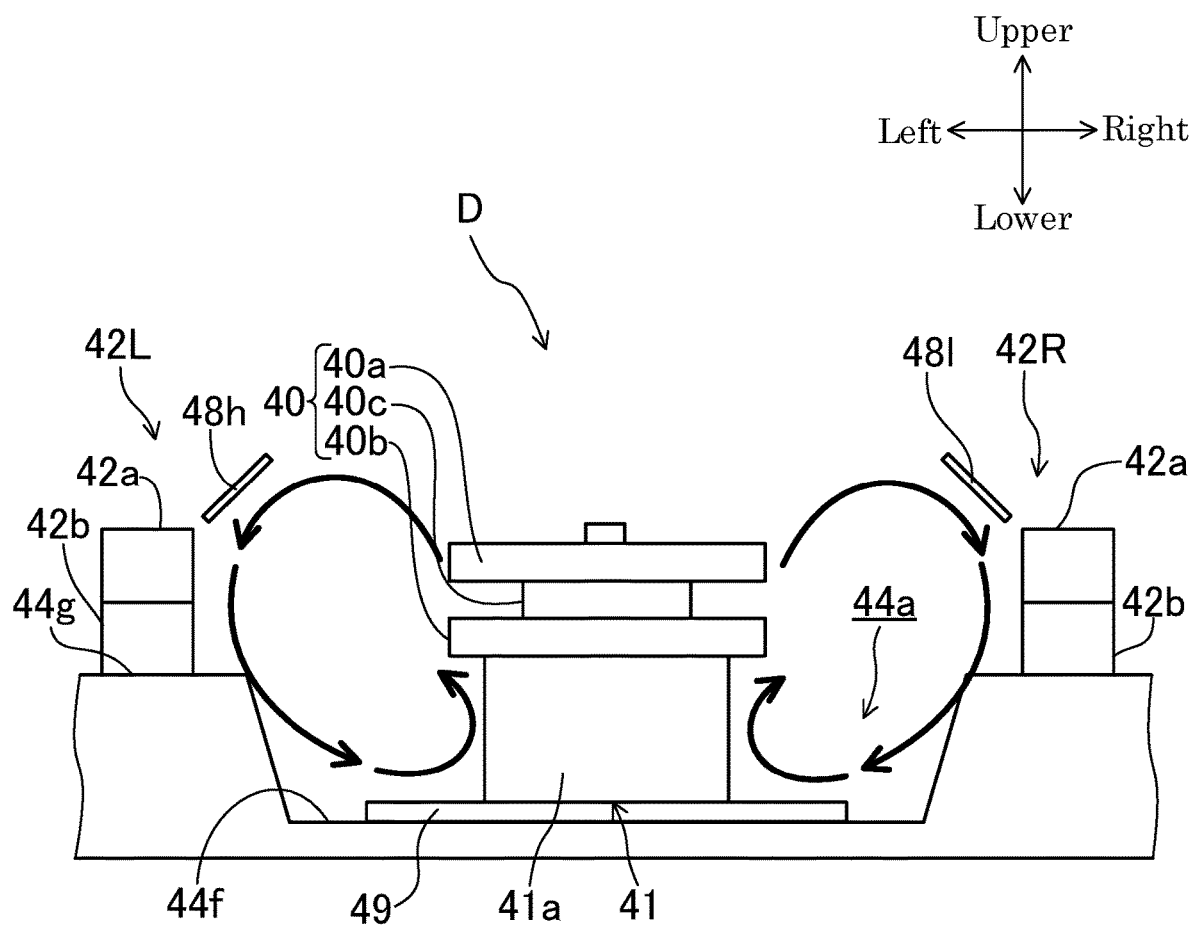
FIG. 8 is a view corresponding to FIG. 5, which illustrates a modification example 2.

According to the optical scanning device 4 of the modification example 2, as illustrated in FIG. 8, airflow induced by the rotation of the polygon mirror unit 40 and flowing radially outward collides with the return mirrors 48h and 48l and thus is deflected downward. Consequently, the aforementioned circulation air current can be more reliably generated. Furthermore, the return mirrors 48h and 48l are used as an airflow deflection member, so that it is possible to reduce the number of parts and thus to reduce the production cost.

Other Embodiments

In the aforementioned embodiment and each modification example, the number of stages of the polygon mirror in the polygon mirror unit 40 is 2; however, the present invention is not limited thereto and the number of stages of the polygon mirror may be 1, or 3 or more.

In the aforementioned embodiment and each modification example, the optical scanning device 4 employs an opposed scanning scheme in which the scanning optical systems are disposed at both right and left sides while interposing the polygon mirror unit 40 therebetween; however, the present invention is not limited thereto and can also be applied to an optical scanning device 4 in which the scanning optical system is disposed only at one side of the polygon mirror unit 40.

In the aforementioned embodiment, the image forming apparatus 1 mounted with the optical scanning device 4 is a laser printer; however, the present invention is not limited thereto. That is, the image forming apparatus 1, for example, may be a copy machine, a multifunctional peripheral (MFP), a facsimile and the like.

Furthermore, the present invention is not limited to the aforementioned embodiment and each modification example and includes configurations obtained by appropriately combining these embodiment and each modification example with one another.

INDUSTRIAL APPLICABILITY

As described above, the present invention is available for an optical scanning device and an image forming apparatus including the same.

The invention claimed is:

1. An optical scanning device comprising:
a housing having an upper side closed by a lid member;
a polygon mirror unit located in the housing, the polygon mirror unit deflecting and scanning light beams emitted from a light source;
a polygon motor having a rotor part provided at a lower side of the polygon mirror unit to rotationally drive the polygon mirror unit; and
image forming lens units that form images of the light beams deflected and scanned in the polygon mirror unit on surfaces to be scanned, wherein
in the housing, an installation surface on which one of the image forming lens units is installed is formed at a higher position by a level difference than an installation surface on which the polygon motor is installed,
when viewed from a rotation axis direction of the polygon mirror unit, a diameter of a circumscribed circle passing each apex of the polygon mirror unit is larger than an outer diameter of the rotor part of the polygon motor,
the housing has a connection surface that connects an edge of the installation surface of the one of the image forming lens units, which faces a side of the polygon motor, to an edge of the installation surface of the polygon motor, which faces a side of the one of the image forming lens units, and
the connection surface is a curved surface having an arc shape in which a slope of a tangent becomes steeper toward the side of the one of the image forming lens units from the side of the polygon motor when viewed from a main scanning direction.

2. The optical scanning device of claim 1, wherein a distance from a lower end surface to an upper end surface of the rotor part is larger than a distance from a lower end surface to an upper end surface of the polygon mirror unit.

3. The optical scanning device of claim 1, wherein, when viewed from the rotation axis direction of the polygon mirror unit, if a distance from the edge of the installation surface of the one of the image forming lens units, which faces the side of the polygon mirror unit, to the one of the image forming lens unit is set as t and a distance from the edge of the installation surface of the polygon motor, which faces the side of the one of the image forming lens units, to an outer peripheral surface of the polygon motor is set as T, a relationship of T>t is satisfied.

4. The optical scanning device of claim 1, further comprising:
a plurality of return mirrors that reflect the light beams deflected and scanned by the polygon mirror unit and having passed through the image forming lens units, and lead the light beams to the surfaces to be scanned,
wherein the plurality of return mirrors includes an inclined mirror inclined downward toward the side of the one of the image forming lens unit from the side of the polygon mirror unit when viewed from the main scanning direction, and
the inclined mirror is disposed such that a lower end thereof is positioned in a vicinity of an edge of an upper end surface of the one of the image forming lens units, which faces the side of the polygon mirror unit.

5. The optical scanning device of claim 1, wherein the polygon mirror unit includes an upper polygon mirror and a lower polygon mirror coaxially disposed with each other while being spaced apart from each other in an up and down direction.

6. The optical scanning device of claim 5, wherein the image forming lens units are symmetrically disposed at opposite sides of a straight line passing through a shaft center of the polygon mirror unit while interposing the straight line therebetween when viewed from a direction of the shaft center.

7. An image forming apparatus comprising the optical scanning device of claim 1.

* * * * *